US006505753B1

(12) United States Patent
Freek et al.

(10) Patent No.: US 6,505,753 B1
(45) Date of Patent: *Jan. 14, 2003

(54) CUP LID HAVING COMBINED STRAW SLOT DEPRESSION AND TEAR BACK LID RETAINER

(75) Inventors: Michael Freek; Michael Thomas, both of Toronto (CA)

(73) Assignee: Fort James Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,267

(22) Filed: Mar. 30, 1999

Related U.S. Application Data

(62) Division of application No. 08/703,771, filed on Aug. 27, 1996, now Pat. No. 5,947,323.

(51) Int. Cl.⁷ ............................................. A47G 19/22
(52) U.S. Cl. ...................... 220/711; 220/254; 220/269; 229/906.1
(58) Field of Search ........................ 220/711–713, 254, 220/780, 789, 790, 810, 836, 837, 265, 269; 229/404, 906.1; D7/900; D9/438

(56) References Cited

U.S. PATENT DOCUMENTS

| | | | | |
|---|---|---|---|---|
| 2,304,214 A | * | 12/1942 | Straub | 220/254 |
| 3,048,317 A | | 8/1962 | Cochrane et al. | |
| 3,524,566 A | | 8/1970 | Parks | |
| 3,822,030 A | | 7/1974 | Tanzer | |
| 3,945,528 A | | 3/1976 | Mowrey, Jr. | |
| 3,994,411 A | | 11/1976 | Elfelt et al. | |
| 4,026,459 A | * | 5/1977 | Blanchard | |
| 4,056,210 A | * | 11/1977 | Boyle | 220/254 |
| 4,090,660 A | | 5/1978 | Schram et al. | |
| 4,184,604 A | * | 1/1980 | Amberg et al. | 220/254 |
| 4,202,459 A | * | 5/1980 | DeParales et al. | 220/712 |
| 4,253,582 A | * | 3/1981 | Shields | 220/712 X |
| 4,438,865 A | * | 3/1984 | Scattaregia | 220/254 |
| 4,460,103 A | * | 7/1984 | Rama et al. | 220/254 |
| 4,502,608 A | | 3/1985 | Mills | |
| 4,629,088 A | * | 12/1986 | Durgin | 220/254 |
| 4,721,210 A | * | 1/1988 | Lawrence et al. | 220/254 X |
| 4,738,373 A | * | 4/1988 | DeParales | 220/254 |
| 4,760,934 A | | 8/1988 | Netsch | |
| 5,025,947 A | | 6/1991 | Leone | |
| 5,090,584 A | * | 2/1992 | Roberts et al. | 220/712 |
| 5,111,961 A | * | 5/1992 | Van Melle | 220/712 |
| 5,183,172 A | * | 2/1993 | Boller | 220/712 X |
| 5,197,624 A | * | 3/1993 | Dodaro | 220/254 |
| 5,335,812 A | * | 8/1994 | Boller | 220/713 X |
| 5,392,949 A | | 2/1995 | McKenna | |
| 5,397,023 A | | 3/1995 | Toczek et al. | |
| 5,460,286 A | | 10/1995 | Rush et al. | |
| 5,490,609 A | * | 2/1996 | Lane et al. | 220/254 X |
| 5,503,289 A | * | 4/1996 | Fox | 220/254 |
| 5,613,619 A | * | 3/1997 | Van Melle | 220/254 X |
| 5,839,601 A | * | 11/1998 | Van Melle | 220/254 X |
| 5,947,323 A | * | 9/1999 | Freek et al. | 220/712 X |

* cited by examiner

Primary Examiner—Lee Young
Assistant Examiner—Robin Hylton
(74) Attorney, Agent, or Firm—Nixon Peabody LLP; Donald R. Studebaker

(57) ABSTRACT

A drink-thru lid for a drinking cup including an annular mounting portion for sealingly engaging the drinking cup, wherein the annular mounting portion includes a downwardly extending annular skirt. The lid further includes a tear-back section extending from the annular skirt to a hinge portion located in a medial portion of the lid. The tear-back section includes a raised protrusion extending outwardly from an upper surface of the lid. A recess is further formed in a medial portion of the lid on the opposite side of the hinge portion from the raised protrusion, wherein the tear-back section may be torn away from the lid on its sides and pivoted about the hinge portion until the raised protrusion is received within the recess for holding said pivotal flap open. The raised protrusion and the recess are shaped such that the raised protrusion is frictionally engaged by the end walls of the recess. The recess further includes a straw slot formed therein, wherein the straw slot is defined by two sloping side walls extending from an upper surface of the lid and converging together at a frangible juncture formed in the deepest portion of the recess.

10 Claims, 4 Drawing Sheets

CUP LID HAVING COMBINED STRAW SLOT DEPRESSION AND TEAR BACK LID RETAINER

This application is a Divisional application of Ser. No. 08/703,771, filed Aug. 27, 1996, now U.S. Pat. No. 5,947,323.

TECHNICAL FIELD OF THE INVENTION

The present invention relates generally to lids for beverage containers and more specifically to lids having a tear-back drink-thru opening flap which is securably held in an open position within a straw depression formed in the lids.

BACKGROUND OF THE INVENTION

It is well-known to provide covers for drinking containers to prevent the spillage of the contents of the container. Many prior art covers incorporate an opening in the top of the cover in order to allow drinking of the contents either in the normal drinking fashion or by the insertion of a straw. Some covers have an opening which is sealed by a depressible tab such that when the tab is depressed by the insertion of a straw, the opening is unsealed for drinking the contents of the container. U.S. Pat. No. 3,048,317 issued to Cochrane et al. discloses one such lid having an opening for a straw disposed in a depression formed in the lid with an integrally formed hinged flap in the bottom of the depression. The hinged flap is severed from the lid about the majority of the periphery of the flap to pivot open when a pressure is exerted on the flap by the end of a straw. However, unless the hinged opening is exactly the same diameter as the straw, the fluid within the cup may spill out the opening between the straw and the sides of the opening once the hinged flap has been pivoted open.

Other covers utilize a releasable drinking flap in order to prevent the sloshing of the contents out of the containers. An example of this type of cover is disclosed in U.S. Pat. No. 4,738,373 issued to DeParales, which shows a cover having a hinged tab which is defined by score lines formed in the cover leading from the rim of the cover to a hinge positioned in the medial portion of the cover. A recess is formed in the cover on the opposite of the hinge from the tab, wherein the recess receives the rim portion of the tab once the tab is torn open and pivoted about the hinge in order to retain the hinged tab in an open position. However, if the user desired to use a straw with a cover of this type, the straw would have to be inserted into the opening created by the tearing open of the hinged tab. This would create an exceptionally large opening for a straw, allowing the straw to float about and allowing the contents of the cup to be spilled.

In an effort to overcome the aforementioned shortcomings, other covers have been proposed utilizing both a straw slot and a releasable flap, depending upon the desired use by the consumer. An example of this type of cover is disclosed in U.S. Pat. No. 4,090,660 to Schram et al., which discloses a cup lid having a liftable tab which snap fits on the rim of a cup with a straw slot formed in the portion of the lid constituting the liftable tab. This design, however, does not include a feature incorporated into the lid which will retain the liftable tab in an open position for convenient repeated drinking from the opening created by the liftable tab.

Another example of a prior art drinking lid utilizing both a straw slot and a releasable flap is disclosed in U.S. Pat. No. 5,335,812 issued to Boller, which shows a lid having a straw puncturable area formed in a rupturable depression in the lid. The lid further includes a flap defined by lines of weakness that may be torn and pivoted to overlie a central portion of the lid to retain the flap in an open position. Of course, designs of this general type forming a retaining portion in the center of the lid to hold the flap open as well as forming a separate rupturable depression for a straw are difficult to mold due to the number of depressions and features which must be formed in the cup lid.

Yet another type of prior art drinking lid utilizing both a straw slot and a releasable flap is disclosed in U.S. Pat. No. 3,994,411 issued to Elfelt et al., which shows a lid having a foldback drink opening. A pull tab formed on the edge of the rim of the foldback portion is insertable in a straw slit formed in the lid in order to hold the foldback portion in an open position. This foldback drink opening requires a great amount of attention by the user to insert the pull tab into the narrow straw slot in order to hold the foldback portion of the lid open. Furthermore, since the straw slot must be forced open to receive the pull tab, the straw slot will be slightly ajar when retaining the pull tab which can allow the contents of the cup to spill therethrough.

Clearly, there is a need for a drink-thru cup lid which provides both a straw slot and a tear-back flap which is simple to form and which does not require multiple separate components to be formed in the lid for each drink-thru feature. Moreover, there is a need for a drink-thru cup lid which securably retains the tear-back flap in place within the straw slot depression without rupturing the cup lid in the straw slot area.

SUMMARY OF THE INVENTION

A primary object of the present invention is to provide a drink-thru cup lid design which overcomes the aforementioned shortcomings associated with prior art designs.

A further object of the present invention is to provide a drink-thru cup lid having a straw slot and a tear-back flap which is simple to manufacture and which does not require multiple separate components to be formed in the lid for each drink-thru feature.

Yet another object of the present invention is to provide a drink-thru cup lid wherein the tear-back flap is securably retained in place within the straw slot depression.

A still further object of the present invention is to provide a drink-thru cup lid wherein the tear-back flap is securably retained in place within the straw slot depression without rupturing the cup lid in the straw slot area.

Yet another object of the present invention is to provide a drink-thru cup lid wherein the skirt of the cup lid includes a plurality of interrupted beads formed therein for securing the cup lid to the brim of a cup.

It is yet another object of the present invention is to provide a drink-thru cup lid, wherein the walls of the straw slot bend without fracturing to conform to the shape of the straw as the straw is inserted into the straw slot in order to seal the cup lid around the straw to prevent the contents of the cup from spilling out of the straw slot.

These, as well as additional objects of the present invention, are achieved by providing a drink-thru lid for a drinking cup including an annular mounting portion for sealingly engaging the drinking cup, wherein the annular mounting portion includes a downwardly extending annular skirt. The lid further includes a pivotal flap extending from the annular skirt to a hinge portion located in a medial portion of the lid. A raised protrusion extends outwardly from an upper surface of the lid where the protrusion is positioned on the pivotal flap between the hinge portion and the annular mounting portion. A recess is further formed in a medial portion of the lid on the opposite side of the hinge portion from the raised protrusion, wherein the pivotal flap may be torn away from the lid on its sides and pivoted about the hinge portion until the raised protrusion is received within the recess for holding said pivotal flap open. The raised protrusion and the recess are shaped such that the raised protrusion is matingly received within the recess with end surfaces of the raised protrusion frictionally engaging end walls of the recess. The recess further includes a straw slot formed therein, wherein the straw slot is defined by two sloping side walls extending from an upper surface of the lid and converging together at a frangible line of weakness formed in the deepest portion of the recess. The sloping side walls also bend to conform to the shape of the straw as a straw is inserted into the straw slot in order to seal the lid around the straw.

In one embodiment of the cup lid of the present invention, a plurality of interrupted beads are formed about the annular skirt to secure the lid to a brim of a cup. The beads are spaced apart from oneanother with beads of a first length being formed in the skirt outside of the section in the skirt included in the pivotal flap and two beads of a second shorter length than the first length being formed in the section of the skirt included in the pivotal flap. The configuration allows the pivotal flap to securably be reattached to the brim of the cup after the pivotal flap has already been torn open.

These, as well as additional objects of the present invention will become apparent from the following detailed description when read in light of the several figures.

DETAILED DESCRIPTION OF THE PREFERRED EMBODIMENT

The present invention is generally embodied in a lid 10 for a drinking cup 12. The lid 10 may be used with cups of various types, and is particularly suitable for use with disposable cups of the type commonly used as carry-out containers for beverages such as coffee and the like. Such cups are commonly made of Styrofoam or paper. The drinking cup 12 has a generally circular upper lip or rim 14 with a bead formed on it for receiving and securing the lid 10 thereon.

Figure 1:
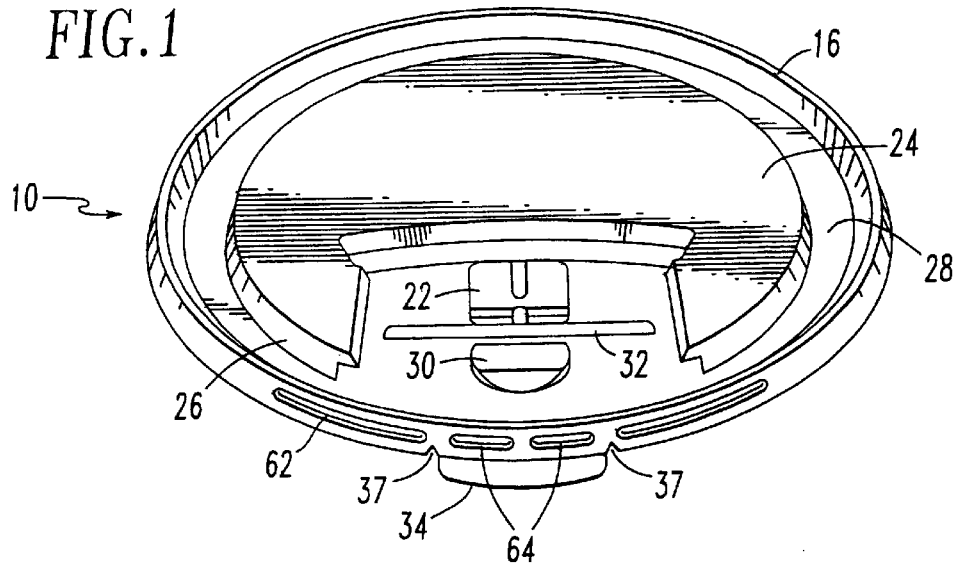
FIG. 1 is a perspective view of a lid in accordance with the present invention.
Figure 2:
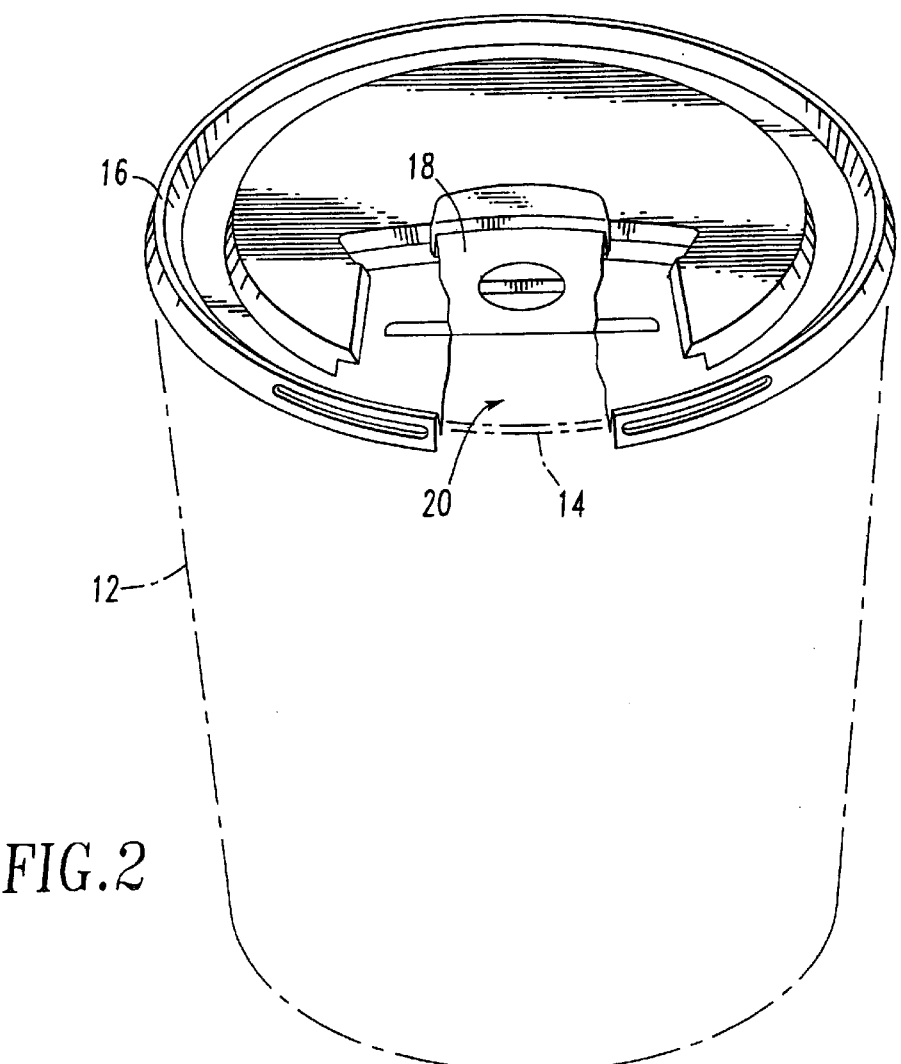
FIG. 2 is a perspective view of the lid illustrated in FIG. 1 with an opening formed by tearing back a portion of the lid.
Figure 3:
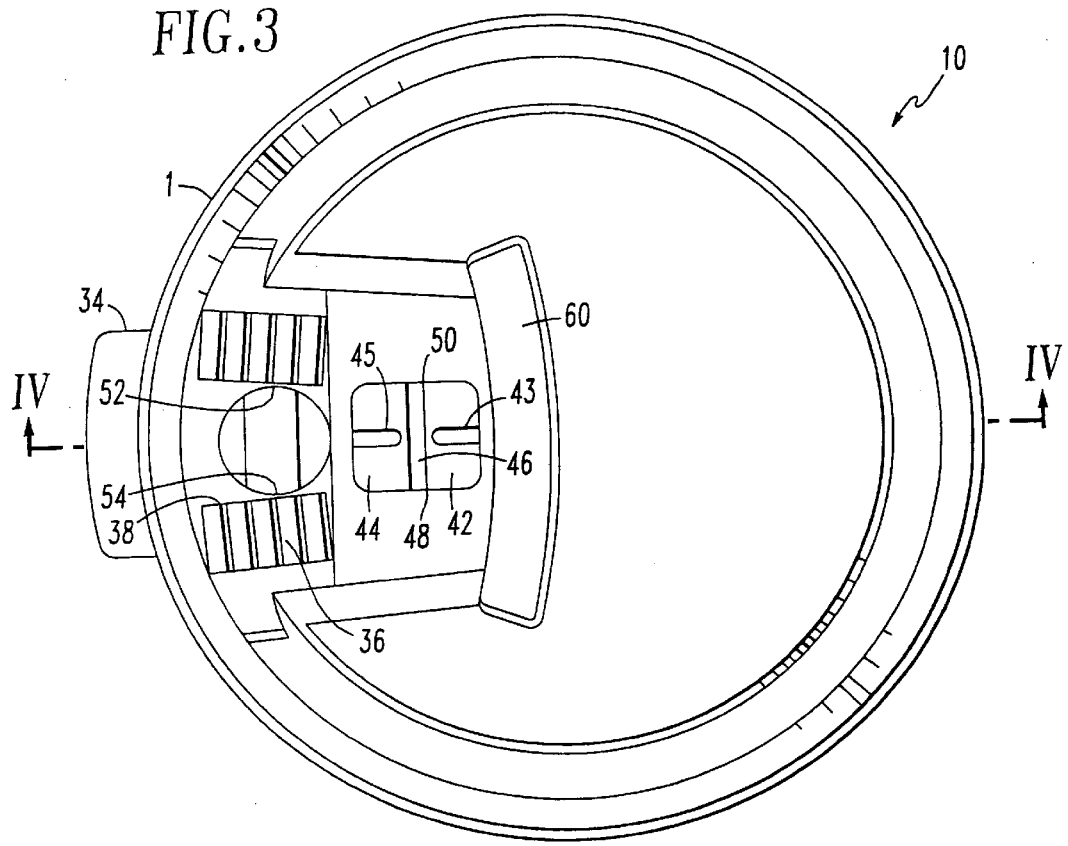
FIG. 3 is a top plan view of the lid illustrated in FIG. 1.

Referring now to FIGS. 1, 2, and 3, the lid 10 of the present invention is illustrated. The lid 10 provides a cover for the cup 12 which inhibits spillage and reduces heat transfer between the beverage and the surrounding atmosphere. The lid 10 is secured in place on the cup 12 by an annular mounting portion 16 which engages the rim or lip 14 of the cup 12, wherein the annular mounting portion 16 includes a downwardly extending skirt 17 which forms the outer peripheral circumference of the lid 10. A portion 18 of the lid 10 may be torn back to provide an opening 20 in the lid 10 to enable drinking from the cup 12 without removal of the lid 10. The lid also includes a straw slot opening 22 which functions as a means for facilitating the insertion of a drinking straw (not shown) into the cup 12 for withdrawing liquid by suction.

A central raised portion 24 is formed about a substantial portion of a medial area within the circumference of the lid 10 with an upstanding annular wall 26 forming the side surfaces of the central raised portion 24. Bridging the space between the mounting portion 16 and the upstanding annular wall 26 is an annular channel 28 which readily receives any fluid which may flow out of the opening 20 when the container is jarred or which may spill during consumption of the container. As can be seen from FIGS. 1 and 2, the annular channel 28 is significant in size to accommodate more than just a few droplets of fluid.

In the preferred embodiment of the present invention, the tear-back portion 18 of the lid 10 and the straw slot opening 22 are formed in a medial portion of the lid which is not raised, wherein the non-raised medial portion is surrounded on three of its sides by central raised portion 24. The straw slot opening 22 is formed radially inward of the tear-back portion 18 of the lid 10, wherein the tear-back portion 18 of the lid 10 includes a protrusion 30 which extends from the upper surface of the lid 10. The tear-back portion 18 of the lid 10 extends from the annular mounting portion 16 to a trough 32 formed radially inward of the annular mounting portion 16 between the protrusion 30 and straw slot opening 22. The trough 32 serves as the pivotal hinge axis for the tear-back portion 18 of the lid 10, so that, as the tear-back portion 18 is torn away from the remaining portion of the lid 10, the tear-back portion 18 will rotate away from the brim 14 of the cup 12 while pivoting about trough 32.

A flange 34 extends from the edge of the skirt 17 away from the cup 12 on the tear-back portion 18 of the lid 10 to provide a gripping surface for a consumer to grasp and pull in order to tear open tear-back portion 18. In order to facilitate tearing, a pair of cuts 36 may be formed through the skirt 17 adjacent to flange 34 to provide a starting point for tearing open tear-back portion 18. In an alternative embodiment of the present invention, a plurality of corrugations 36 may be formed on both sides of protrusion 30, as shown in FIG. 3, to direct the tearing of tear-back portion 18 in a predetermined manner and prevent accidental and random tear directions to be assumed. The corrugations 36 preclude random tearing by the fact that the lid structure is extremely rigid across the corrugated sections 36 and weak only on the precise line at which the corrugations 36 stop. Therefore, a sharp and accurate tear line is provided along the edge 38 of the corrugations 36 without the disadvantages of a score line which is the most frequently used tear inducing means. The formation of corrugations 36 in the lid 10 provides a simple and efficient method of producing an accurate tear line since the corrugations 36 can be formed along with the rest of the lid 10 and delicate tool adjusting is not required as is required with a score line to avoid cutting through the lid material if the score is too deep or forming an inadequate score line if too shallow.

Figure 4:
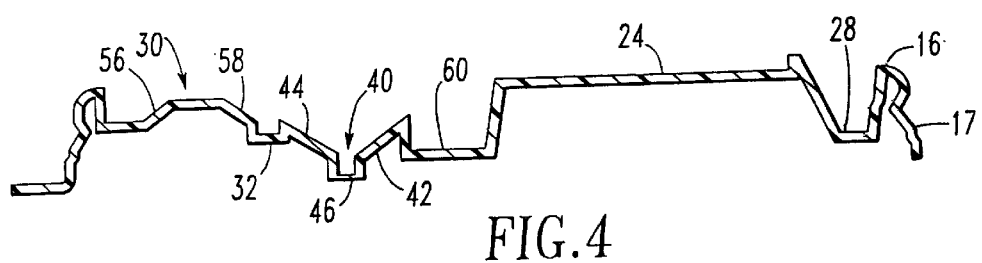
FIG. 4 is a cross-sectional side view of the lid of FIG. 1 taken along line IV—IV of FIG. 3.

The straw slot opening 22 is formed in a depression 40 within the lid 10, wherein the depression 40 facilitates the receipt of the end of a straw (not shown) in the straw slot opening 22 as the opening to the depression 40 in the top surface of the lid 10 is larger than the diameter of the straw. The depression 40 includes a pair of sloping side walls 42 and 44 which extend from the top surface of the lid 10 toward a frangible junction 46 at the bottom of the depression 40, so that the depression 40 has a V-shaped or triangular cross-sectional shape, as can be seen from FIG. 4. The thickness of the lid material at frangible portion 46 is thinner than the lid material in the other portions of the lid 10 to allow frangible portion 46 to be ruptured by the force exerted by the end of a straw as it is inserted into straw slot opening 22. As a straw is inserted into straw slot opening 22, the tapered shape of the depression 40 causes the circular shape of the end of the straw to flatten until the end of the straw deforms into a V-shaped cross-sectional shape similar to that of the depression 40. Therefore, the end of the straw is deformed into a point as it progresses into depression 40 which acts to assist in piercing frangible portion 46 in addition to the force applied by the straw pushing side walls 42 and 44 away from oneanother. The side walls 42 and 46 further extend between end walls 48 and 50 in depression 40, wherein end walls 48 and 50 prevent against extended fracture, cracking or tearing of the frangible junction 46 which may be caused by the insertion of the drinking straw into the straw slot opening 22. Due to the V-shaped configuration of the depression 40, a momentary countering force is created to center the straw over the frangible portion 46 by side walls 42 and 44. If the force used to insert the straw is excessive, the end walls 48 and 50 provide a structure which redirects and absorbs the tearing forces to prevent extended tears across the lid 10. The momentary excessive force will be absorbed by the end walls 48 and 50 such that the radial propagation of the tear will reach the end walls 48 and 50 which causes the radial force to be redirected upwardly which prevents continued tearing of the frangible juncture 46.

The frangible portion 46 is formed at substantially the same time as the remaining structural portions of the lid configuration. That is, a sheet of thermo-deformable material, such as thermoplastic, is placed in a predetermined position with respect to a die element in a known manner for forming lids of this nature. The thermo-deformable material is either previously heated or subsequently heated to a deformable temperature and then vacuum formed over the die element. A suction device draws the thermodeformable material into a depression in the die element to form depression 40, wherein the thermo-deformable material is drawn into the depression until the desired thickness of the material forming frangible portion 46 at the bottom of the depression is achieved. Therefore, frangible portion 46 is formed at the same time as the rest of the lid configuration without the need for delicate tool adjusting to provide the proper scoring in the lid material as is usually done when forming straw slots. Furthermore, since frangible portion 46 is integrally formed with the rest of the lid 10, the lid 10 has no openings where the contents of the cup 12 can spill out if the cup 12 is advertently knocked over. While the depression 40 is described above as having a V-shaped cross-sectional shape, it is understood that the depression 40 may comprise any shape which allows the straw slot opening 22 to function with the goals and objectives of the present lid configuration as described herein.

Once frangible junction 46 is broken by the end of a straw, the side walls 42 and 44 of depression 40 are separated from oneanother and allow the straw to travel into the cup 12 between the side walls 42 and 44. As the straw passes between side walls 42 and 44, the side walls 42 and 44 bend around the straw to conform to the shape of the straw. Therefore, the side walls 42 and 44 provide a close engagement around the inserted straw, which acts to seal the cup lid 10 around the straw to prevent the contents of the cup 12 from spilling out of the straw slot opening 22 between the straw and side walls 42 and 44. Additionally, each of side walls 42 and 44 included guides 43 and 45, respectively which aid the consumer in inserting the straw into the depression 40.

The protrusion 30 is shaped such that when the tear-back portion 18 of the lid 10 is opened and pivoted about hinge 32, the protrusion 30 is received within depression 40 to retain the protrusion in an open position, as shown in FIG. 2. The width of protrusion 30 is slightly larger than the width of depression 40, resulting in the end walls 48 and 50 frictionally engaging the end surfaces 52 and 54 of protrusion 30 to hold the protrusion within depression 40. In order to be received within depression 40, protrusion 30 includes sloping side surfaces 56 and 58 of a substantially similar slope to that of sloping side walls 42 and 44 of depression 40, wherein sloping side surfaces 56 and 58 rest adjacent to sloping side walls 42 and 44, respectively, when protrusion 30 is inserted into depression 40. In the preferred embodiment of the present invention, protrusion 30 has a substantially trapezoidal cross-sectional shape, as illustrated best in FIG. 4. However, protrusion 30 may be triangular or any other shape which allows the protrusion to be positioned within depression 40 without rupturing frangible juncture 46.

By forming protrusion 30 having a substantially similar shape as depression 40, the protrusion 30 will not engage the sloping side walls 42 and 44 of depression 40 and cause frangible juncture 46 to be broken. Therefore, the straw slot opening 22 remains unaffected and frangible juncture 46 remains intact when the straw slot depression 40 is used to retain the tear-back portion 18 of the lid 10 in an open position. Even if frangible juncture 46 is broken by inserting a straw into depression 40, end walls 48 and 50 of depression 40 will still function equivalently by frictionally engaging protrusion 30 to retain the tear-back portion 18 in the open position. Accordingly, the prior use of one of the drink-thru features of the lid 10 will not affect later use of the other drink-thru feature by a consumer.

Figure 5:
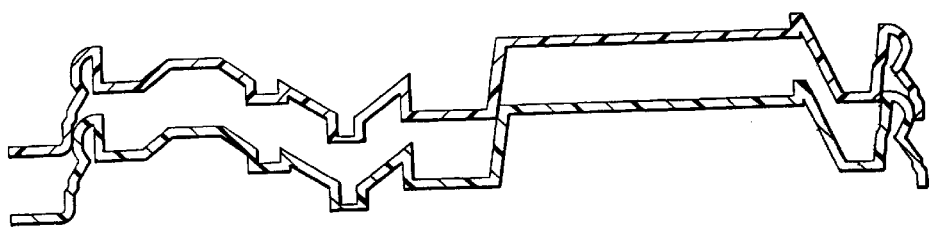
FIG. 5 is a cross-sectional side view of the lid of FIG. 4 in a stacked relationship with another lid.

A recess 60 is also formed in the lid configuration radially inward of the depression 40 for receiving the mounting portion 16 of the lid 10 when the tear-back portion 18 is retained in its open position. The lid configuration is further designed such that a plurality of lids 10 may be positioned together in a stacked relationship, as shown in FIG. 5.

In one embodiment of the lid configuration of the present invention, a plurality of inwardly projecting interrupted beads 62 are formed about the periphery of the skirt 17 to assist in retaining the lid 10 on the rim 14 of the cup 12. The beads 62 extend radially inward further than the remaining portions of skirt 17, causing the mounting portion 16 of the lid 10 to engage the rim 14 of the cup 12 more tightly in the portions of the skirt 17 where the beads 62 are formed. This causes a greater frictional engagement between the lid 10 and the rim 14 of the cup 12 at beaded portions 62 which assists in retaining the lid 10 on the rim 14 of the cup 12. Greater frictional engagement between the lid 10 and cup 12 is especially useful in retaining the lid 10 in place when an upward force is applied on flange 34 to tear open tearback portion 18. For this reason, beads 62 of a first predetermined length are formed in the skirt 17 at least on both sides of tear-back portion 18 to retain the lid 10 on the rim 14 of the cup 12 as a force trying to remove the lid 10 will be exerted on that area of the lid 10 when tear-back portion 18 is opened. Furthermore, two spaced-apart beads 64 of a second predetermined length, shorter than the beads 62 of the first predetermined length, are formed in the skirt 17 connected to tear-back portion 18. The beads 64 assist in retaining the tear-back portion 18 of the lid 10 on the rim 14 of the cup 12, especially when closing tear-back portion 18 after it has already been opened.

Figure 6:
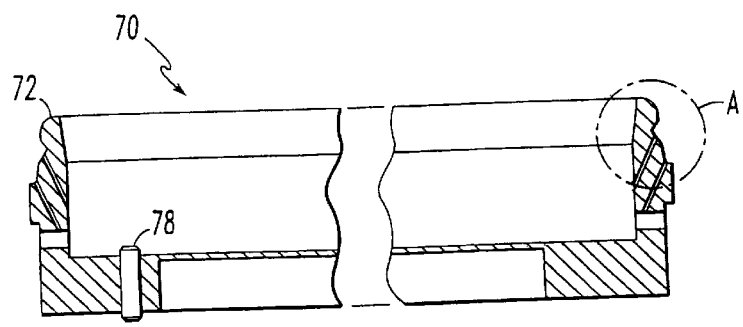
FIG. 6 is a cross-sectional side view of the mold used to form beads in the skirt of the lid of FIG. 1.
Figure 7:
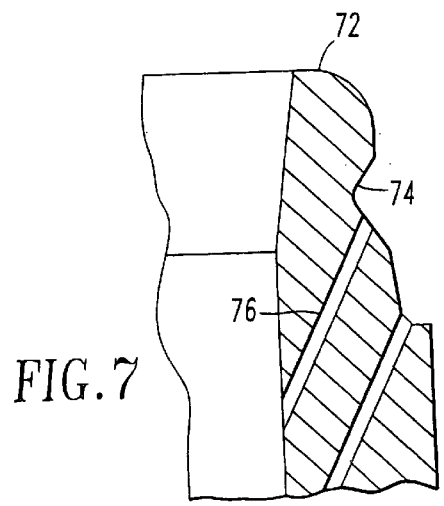
FIG. 7 is an enlarged, cross-sectional side view of the area A of the mold of FIG. 6.

FIG. 6 shows a cross-sectional view of a die element 70 which may be used to form the interrupted beads 62 and 64 of the lid illustrated in FIG. 1. This die 70 is used along with otherwise conventional thermoforming equipment in a lid thermoforming process such as is conventionally performed to create the remaining features molded into the plastic disposable cup lids 10. Further, the die 70 may be readily added to the present thermoforming cup dies for the formation of disposable cup lids. The die 70 includes an outer circumferential projection 72 which is used to form the mounting portion 16 and skirt 17 of the lid 10. FIG. 7 shows an enlarged view of area A on the circumferential projection 72 of FIG. 7. The projection 72 includes a plurality of indentations 74 which are used to form interrupted beads 62 and 64, wherein vacuum passageways 76 are formed in the die 70 extending from indentations 74 to a suction device (not shown) to draw the thermo-deformable material in the indentations 74.

Figure 8:
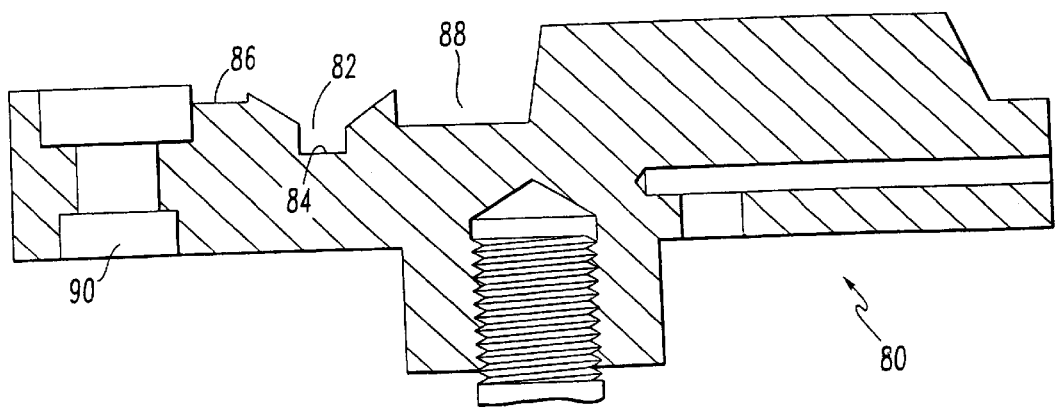
FIG. 8 is a cross-sectional side view of the mold used to form the lid of FIG. 1.
Figure 9:
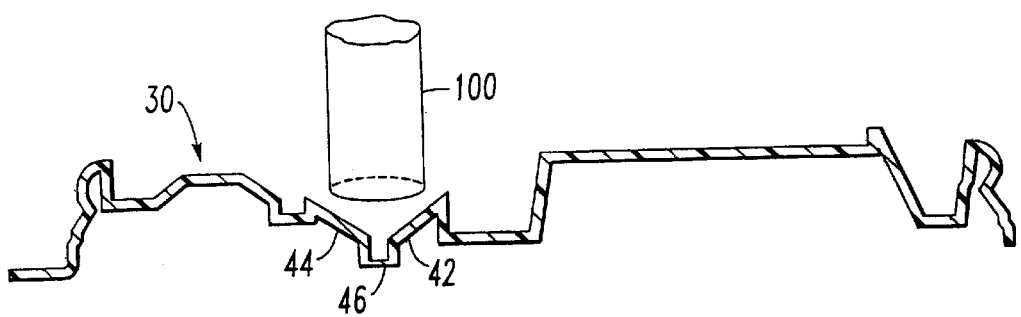
FIGS. 9–11 illustrate a process of inserting a straw through the lid in accordance with the present invention.
Figure 10:
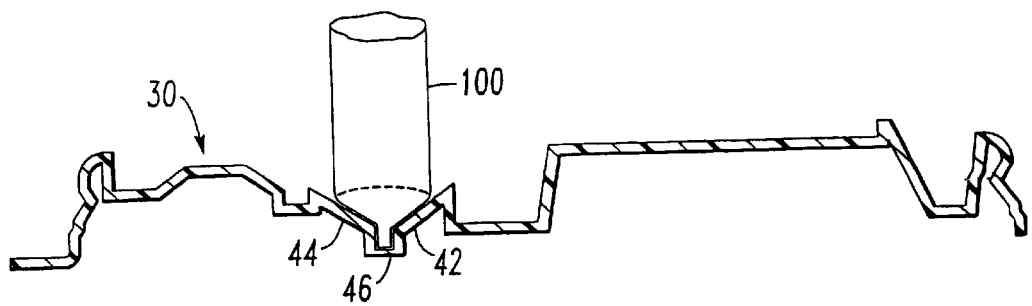
Figure 11:
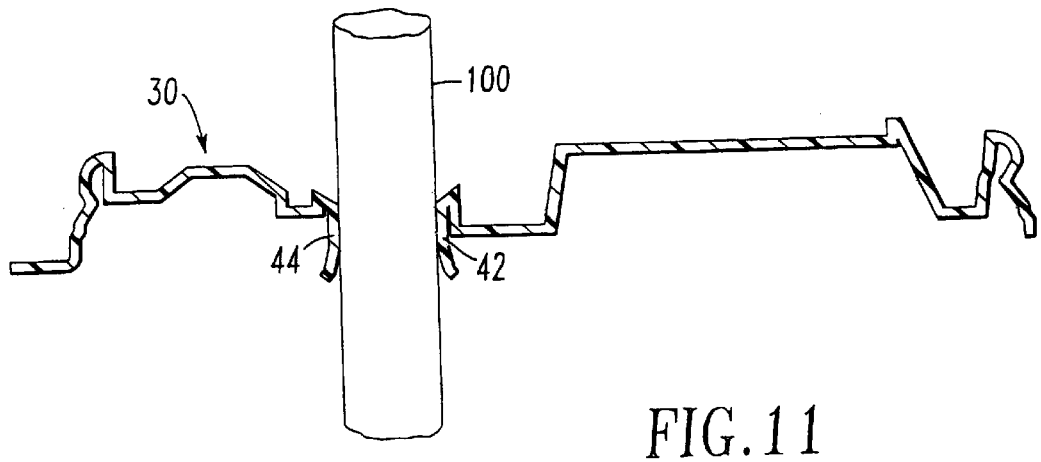

FIG. 8 shows a die element 80 which may be used to form the remaining portions of the lid configuration of the present invention, wherein die element 80 may be used in conjunction with die element 70 to form lid 10. The die 80 includes recess 82 designed to form straw slot depression 40, wherein a groove 84 is formed at the bottom of recess 82 to form frangible portion 46. A vacuum passageway, similar to that of vacuum passageway 76, is formed at the nadir of groove 84 to draw the thermo-deformable material into recess 82. The die 80 also includes recesses 86 and 88 to form trough 32 and recess 60 in the lid 10, respectively. Additionally, die 80 includes an aperture 90 for receiving an alignment projection 78 from die 70 in order to ensure the interrupted beads 62 and 64 are formed in the proper locations with respect to the remaining features of the lid formed by die 80.

As can be seen from the foregoing, a cup lid formed in accordance with the present invention provides a simpler structure to manufacture due the straw slot depression 40 serving dual functions of providing a straw slot opening as well as retaining the tear-back portion 18 of the lid in an open position. Therefore, only one depression needs to be formed in the cup lid to accomplish both functions. Furthermore, forming a cup lid in accordance with the present invention provides a straw slot and tear-open flap which can be molded at substantially the same time as the remaining features of the lid without the need for precise tooling to perform scoring in the lid.

While the present invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A disposable lid for a drinking cup comprising:
    a substantially planar cover portion;
    an annular mounting portion surrounding a periphery of said planar cover portion for sealingly engaging the drinking cup; said annular mounting portion including a downwardly extending annular skirt;
    a tear-back section extending from said annular skirt to a medial portion of the lid, said tear-back section being formed within a quadrant of said annular mounting portion and said planar portion;
    a raised protrusion extending from an upper surface of said tear-back section of the lid, said raised protrusion having a circumferential dimension less than a corresponding circumferential dimension of said tear back section;
    a hinge region located in said quadrant of said planar cover portion; and
    a recess formed in said quadrant of said planar cover portion of the lid on an opposing side of said hinge region from said raised protrusion, said recess having an inner surface extending from said planar cover portion to a bottom surface, said recess having a circumferential dimension equal to or less than said circumferential dimension of said protrusion such that said tear-back section of the lid may be displaced from the lid and pivoted about said hinge region until said circumferential dimension of said raised protrusion is received within said circumferential dimension of said recess, wherein said protrusion frictionally engages said inner surface of said recess to retain said tear-back section of the lid in an open position.

2. The lid as defined in claim 1, wherein said protrusion and said recess have similar matingly engageable cross-sectional shapes.

3. A disposable lid for a drinking cup comprising:
    a substantially planar cover portion;
    an annular mounting portion surrounding a periphery of said planar cover portion for sealingly engaging the drinking cup; said annular mounting portion including a downwardly extending annular skirt;
    a tear-back section extending from said annular skirt to a medial portion of the lid, said tear-back section being formed within a quadrant of said annular mounting portion and said planar portion;
    a raised protrusion extending from an upper surface of said tear-back section of the lid, said raised protrusion having a circumferential dimension less than a corresponding circumferential dimension of said tear back section;
    a hinge region located in said quadrant of said planar cover portion; and
    a recess formed in said quadrant of said planar cover portion of the lid on an opposing side of said hinge region from said raised protrusion, said recess including an inner surface extending from said planar cover portion to a bottom surface such that said tear-back section of the lid may be displaced from the lid and pivoted about said hinge region until said circumferential dimension of said raised protrusion is received within said recess, wherein said protrusion frictionally engages the inner surface of said recess to retain said tear-back section of the lid in an open position,
    wherein said protrusion is substantially circular in cross section and said recess is substantially polygonal in cross section and a diameter of said protrusion is equal to or greater than a distance between opposing side walls of said inner surface of said recess such that the protrusion frictionally engages said inner surface of said recess in concentrated regions.

4. The lid as defined in claim 1, further comprising a plurality of beads formed in said annular skirt to secure the lid to a brim of the drinking cup.

5. The lid as defined in claim 4, wherein said beads are spaced apart from one another with beads having a first length being formed in said skirt adjacent to both sides of a section of said skirt included in said tear-back section of the lid and two beads having a second length shorter than said first length are formed in the section of said skirt included in said tear-back section of the lid.

6. A disposable lid for a drinking cup comprising:
- a substantially planar cover portion including a first substantially horizontal plane and a second substantially horizontal plane;
- an annular mounting portion surrounding a periphery of said planar cover portion for sealingly engaging the drinking cup; said annular mounting portion including a downwardly extending annular skirt;
- a tear-back section extending from said annular skirt to a hinge region located in a medial portion of the lid;
- a raised protrusion extending from an upper surface of said tear-back section of the lid, said raised protrusion having a circumferential dimension less than a corresponding circumferential dimension of said tear back section; and
- a recess formed in a medial portion of the lid on an opposing side of said hinge region from said tear-back section such that said tear-back section of the lid may be displaced from the lid and pivoted about said hinge region until said circumferential dimension of said raised protrusion is received within said recess;
- wherein said raised protrusion, said hinge region, said recess and said tear-back section of the lid are formed in said second horizontal plane of said planar cover portion positioned lower than said first horizontal plane.

7. The lid as defined in claim 6, wherein said protrusion and said recess have similar matingly engageable cross-sectional shapes.

8. The lid as defined in claim 6, wherein said protrusion is substantially circular in cross section and said recess is substantially polygonal in cross section such that said protrusion frictionally engages said depression in concentrated regions.

9. The lid as defined in claim 6, further comprising an upstanding side wall extending from said first horizontal plane to said second horizontal plane to the lid.

10. The lid as defined in claim 9, wherein said tear-back section, said hinge region said raised protrusion and said recess are formed in a quadrant of said lid.

* * * * *